(12) United States Patent
Sugimoto

(10) Patent No.: US 6,687,808 B2
(45) Date of Patent: Feb. 3, 2004

(54) DATA PROCESSOR USING INDIRECT REGISTER ADDRESSING

(75) Inventor: Hideki Sugimoto, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 10/206,058

(22) Filed: Jul. 29, 2002

(65) Prior Publication Data

US 2003/0028754 A1 Feb. 6, 2003

(30) Foreign Application Priority Data

Aug. 1, 2001 (JP) ........................................ 2001-234279

(51) Int. Cl.[7] .............................................. G06F 9/30
(52) U.S. Cl. ...................... 712/209; 711/202; 711/214; 712/220; 712/225
(58) Field of Search ................................ 711/202, 214; 712/220–225, 209

(56) References Cited

U.S. PATENT DOCUMENTS 5,890,222 A * 3/1999 Agarwal et al. ............ 711/220
6,098,160 A * 8/2000 Drake et al. ................ 711/200
6,167,497 A * 12/2000 Nakatsuka et al. ......... 711/202

FOREIGN PATENT DOCUMENTS

| JP | 58-40668 | 3/1983 |
| JP | 10-11352 | 1/1998 |

\* cited by examiner

*Primary Examiner*—Michael Tokar
*Assistant Examiner*—Khai Nguyen
(74) *Attorney, Agent, or Firm*—Young & Thompson

(57) ABSTRACT

A data processor is composed of a register file including a plurality of registers each of which stores therein an operand data, a register pointer section which includes a plurality of register pointers, an instruction register, a data type converter unit, and a processing unit. Each of the register pointers stores therein a register address and a data type of the operand data stored in the register specified by the register address. The instruction register fetches an instruction word including an operation code, and an operand field. The operand field is representative of a register pointer address used for addressing a selected one of the register pointers to thereby indirectly addressing a selected one of the register.

11 Claims, 6 Drawing Sheets

DATA PROCESSOR USING INDIRECT REGISTER ADDRESSING

BACKGROUND OF THE INVENTION

1. Field of the Invention

The present invention relates to a data processor. More particularly, the present invention relates to a data processor using indirect addressing of registers.

2. Description of the Related Art

Operation frequencies of data processors have been recently increased while access times to memories have been decreased. This situation increases a need for reducing in access times of memories.

A technique is widely used in which a part of a working set within data on a memory is stored in a register to thereby reduce an access time of a memory. However, this technique requires an increase in the number of the registers to reduce the memory access. The increase of the registers prolongs instruction words and thus increases the amount of accesses needed for executing the instructions. Hence, the conventional technique encounters a demerit from the viewpoints of the performance ability and the cost.

When data stored in a register is processed by a data processor, data conversion is often requested. FIG. 1 shows a typical process of executing an instruction accompanied by data conversion. The instruction is executed in the three phases: a pre-operation data conversion (S101), an operation (S102) and a post-operation data conversion (S103). The pre-operation conversion (S101) is composed of a register read (S111), a data conversion (S112) and a register write (S113). The operation (S102) is composed of a register read (S114), an operation (S115) and a register write (S116). The post-operation conversion (S103) is composed of a register read (S117), a data conversion (S118) and a register write (S119).

A process of executing an instruction includes instruction fetch IF, instruction decode ID, instruction execution EX, data forward DF and data write WB.

The instruction fetch IF is an action for reading out an instruction word from a main memory and transiently storing the instruction word in an instruction register.

The instruction decode ID is an action for decoding the instruction word. At first, an operation is specified on the basis of the operation code in the instruction word, and then a pre-operation data conversion is specified, and a post-operation data conversion is specified. Furthermore, a register address specifying a register for storing the operation result is specified on the basis of the operand field(s) of the instruction word.

The instruction execution EX is an action for executing an operation on the operand data. The data forward DF is an action for forwarding the operation result to a buffer and transiently storing the operation result therein. The write WB is an action for writing the operation result stored in the buffer to the specified register of the register file.

Data processors are often pipelined to improve the processing ability. In such data processors, executions of instructions are overlapped to increase the effective operation speed.

FIG. 2 shows a typical pipelining technique. To execute an instruction, instruction fetch IF, instruction decode ID, instruction execution EX, e data forward DF, and the data write WB are sequentially executed.

To execute a next instruction, instruction fetch IF for the next instruction is executed in parallel with the instruction decode ID for the previous instruction. Then, instruction decode ID for the next instruction is executed in parallel with the instruction execution EX for the previous instruction. Next, instruction execution EX for the next instruction is executed in parallel with the data forward DF of the previous instruction. And, data forward DF for the next instruction is then executed in parallel with the write WB for the previous instruction. Finally, data write WB for the next instruction is executed.

If the next instruction has a dependence on the previous instruction, the operation result obtained by the instruction execution EX for the previous instruction can be forwarded during the instruction decode ID for the next instruction word. As a result, each of the instruction words can be executed substantially in one clock cycle.

However, execution of an instruction that requests data conversion degrades the processing ability of pipelined data processors. FIG. 3 shows a process of executing an instruction requesting a pre-operation data conversion in a pipelined data processor. An instruction accompanied by the pre-operation data conversion is separated into a data conversion instruction and an operation instruction. Firstly, instruction fetch IF, instruction decode ID, instruction execution EX, data forward DF, and data write WB are executed for the data conversion instruction.

Instruction fetch IF for the operation instruction is executed in parallel with the instruction execution EX for the data conversion instruction. This means one clock cycle is wasted. Instruction decode ID for the operation instruction is then executed in parallel with the data forward DF for the data conversion instruction, and instruction execution EX is executed in parallel with the data write WB for the previous instruction word. After that, data forward DF and data write WB are executed for the operation instruction.

To execute a next instruction, instruction fetch IF for the next instruction is executed in parallel with the instruction decode ID of the operation instruction of the previous instruction. Instruction decode ID for the next instruction is then executed in parallel with the instruction execution EX for the operation instruction. Instruction execution EX for the next instruction is executed in parallel with the data forward DF for the operation instruction, and the data forward DF for the next instruction is executed in parallel with the data write WB for the operation instruction. After that, the data write WB for the next instruction is executed.

When the next instruction has a dependence on the previous instruction word, the operation result produced by the instruction execution EX for the operation instruction is forwarded during the instruction decode ID for the next instruction word. This implies that it takes three clock cycles for an instruction accompanied by the pre-operation data conversion to be executed.

FIG. 4 shows a process of executing an instruction accompanied by post-operation data conversion in a typical pipelined data processor. The instruction accompanied by the post-operation data conversion is separated into an operation instruction and a data conversion instruction. Instruction fetch IF, instruction decode ID, instruction execution EX, data forward DF and data write WB are sequentially executed for the operation instruction.

The instruction fetch IF for the data conversion instruction is executed in parallel with the instruction decode ID for the operation instruction. The instruction decode ID is then executed in parallel with the instruction execution EX for the operation instruction, and then the instruction execution EX is executed in parallel with the data forward DF for the operation instruction. Next the data forward DF is executed in parallel with the data write WB for the operation instruction. Finally, the data write WB for the data conversion instruction is executed. The operation result produced by the instruction execution EX for the operation instruction word is forwarded during the instruction decode ID for the data conversion instruction.

To execute a next instruction, the instruction fetch IF for the next instruction is executed in parallel with the instruction decode ID for the data conversion instruction. Next the instruction decode ID is executed in parallel with the instruction execution EX for the data conversion instruction, and then the instruction execution EX is executed in parallel with the data forward DF for the data conversion instruction. The data forward DF is then executed in parallel with the data write WB for the data conversion instruction. Finally, the data write WB for the next instruction is finally executed. It takes substantially two clock cycles for the instruction requesting data conversion after the operation to be executed.

When data conversion is requested in data processing, the conventional data processor requests a set of data conversion instructions that are respectively provided for possible data conversions, or requests a set of instructions respectively provided for available data types. Therefore, an increase in the number of available data types increases the number of instructions, and also increases the instruction word lengths of the instructions.

Moreover, in the conventional data processor, an instruction specifies a location of data to be processed and the data type thereof. Hence, the change in the number of the registers for storing data to be processed enforces the modification of the instruction set. This hinders the conventional data processor to have compatibility of the instruction architecture.

Nakatsuka et al discloses a data processor which may be related to the present invention in Japanese Laid Open Patent Application (JP-A-Heisei 10-11352) is disclosed. The conventional data processor executes indirect addressing to fetch data to be processed from a register. The conventional data processor has physical registers, the number of which is greater than that of the logical registers. When the conventional data processor fetches an instruction, the conventional data processor determines a relationship between logical registers and physical registers on the basis of the instruction to produce a register-addressing field that allows an access to an accessible range of the logical registers. And the conventional data processor executes an access to the physical register by using the register-addressing field.

Sawada discloses another data processor which may be related to the present invention in Japanese Open Laid Patent Application (Jp-A-Showa 58-40668). The other conventional data processor executes indirect addressing for a register that stores data. The indirect addressing is achieved by a register address register which stores an address identifying a location of the register where the data to be processed. The register address register is counted up or down when the register is selected to be access.

SUMMARY OF THE INVENTION

An object of the present invention is to provide an improved data processor and data processing method for increasing an operation speed thereof.

Another object of the present invention is to provide an improved data processor and data processing method for reducing the number of instructions used in the data processor.

Another object of the present invention is to provide a data processor and a data processing method for shortening a word length of instruction word used therein.

Still another object of the present invention is to provide a data processor and a data processing method for enabling to increase a number of registers while maintaining compatibility of instruction architecture.

In order to achieve an aspect of the present invention, a data processor is composed of a register file including a plurality of registers, a register pointer section including a plurality of register pointers, an instruction register, a data type converter unit, and a processing unit. The each of the registers in the register file stores therein an operand data. Each of the register pointers stores therein a register address and a data type of the operand data stored in the register specified by the register address. The instruction register fetches an instruction word. The instruction word includes an operation code and an operand field representative of a register pointer address used for addressing a selected one of the register pointers to thereby indirectly addressing a selected one of the registers. The data type converter unit executes a data conversion on the operand data stored in the selected one of the registers to produce a converted operand data, on the basis of the data type stored in the selected register pointer specified by the register pointer address. The processing unit executes an operation specified by the operation code on the converted operand data to produce an operation result.

The data conversion on the operand data is preferably achieved without using software.

The data conversion on the operand data and the operation on the converted operand data are preferably executed during the same clock cycle.

The instruction word may further include another operand field indicative of another register pointer address to thereby indirectly specify a target register from among the plurality of registers. In this case, the operation result is stored in the target register.

The data processor is preferably further composed of another data converter unit executing another data conversion on the operation result on the basis of the data type specified by the another register pointer address.

The other data conversion on the operation result is preferably achieved without using software.

When the register pointer section includes a plurality of register pointer arrays, each of which respectively including ones of the register pointers, it is preferable that the data processor is further composed of a register bank controller which activates one of the plurality of register pointer arrays on the basis of the instruction word.

In order to achieve another aspect of the present invention, a data processor is composed of a register file including a plurality of registers, a read register pointer section including a plurality of read register pointers, a write register pointer section including a plurality of write register pointers, an instruction register, a processor unit, and first and second data type converter units. Each of the registers in the register file stores therein an operand data. Each of the read register pointers stores therein a read register address and a data type of the operand data stored in the register specified by the read register address. Each of the write register pointers stores therein a write register address and a data type of the operand data stored in the register specified by the write register address. The instruction register fetches an instruction word. The instruction word includes an operation code, and first and second operand field. The first operand field is indicative of a read register pointer address used for addressing a read register pointer from among the plurality of read register pointers to thereby indirectly address a read register from among the plurality of registers. The second operant field is indicative of a write register pointer address used for addressing a write register pointer from among the plurality of write register pointers to thereby indirectly address a write register from among the plurality of registers. The first data type converter unit executes a data conversion on the operand data stored in the read register to produce a converted operand data on the basis of the data type specified by the read register pointer address. The processor unit executes an operation specified by the operation code on the converted operand data to produce an operation result. The second data type converter unit executes another data conversion on the operation result to produce a converted operation result on the basis of the data type specified by the write register pointer address. The converted operation result is stored in the write register.

In this case, the first operand field may be allowed to be used as the second operand field.

DESCRIPTION OF THE PREFERRED EMBODIMENTS

An embodiment of a data processor according to the present invention will be described below with reference to the attached drawings.

Figure 1:
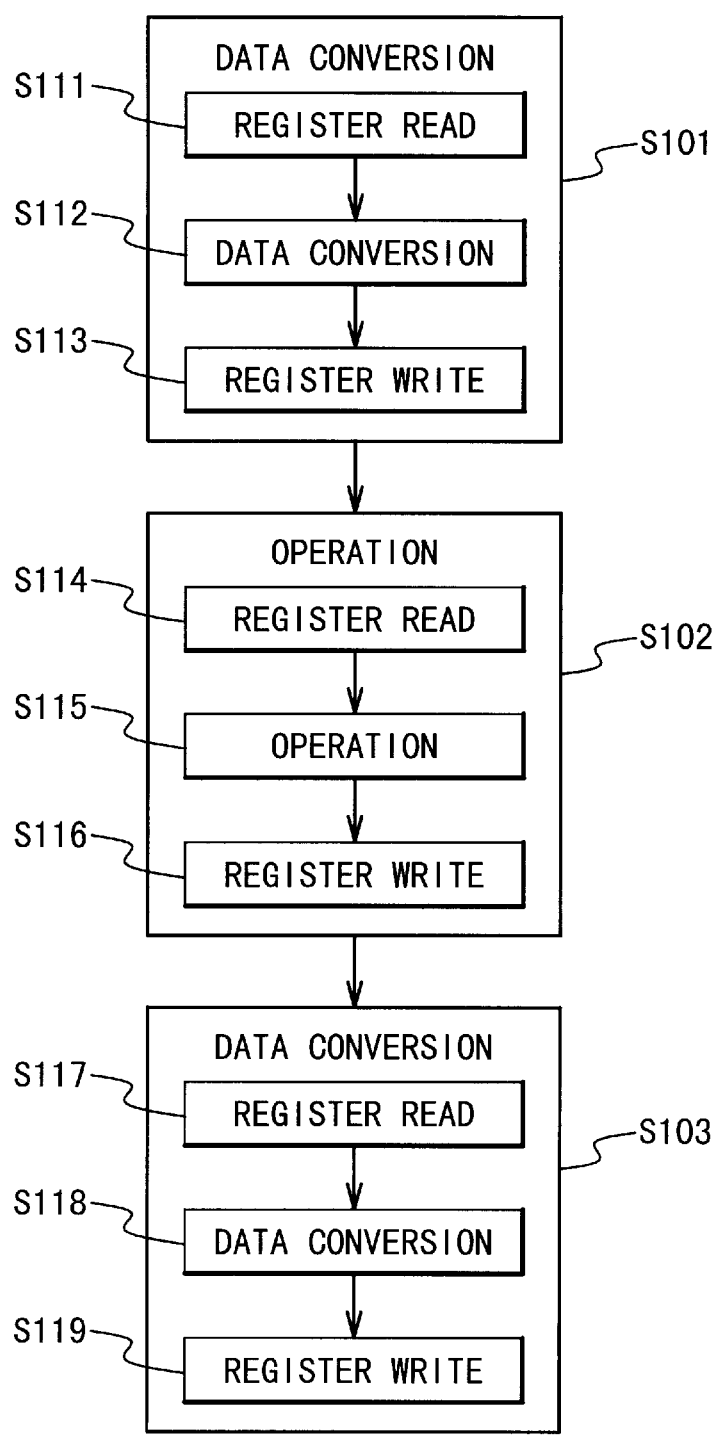
FIG. 1 shows a typical process of executing an instruction accompanied by data conversion.
Figure 2:
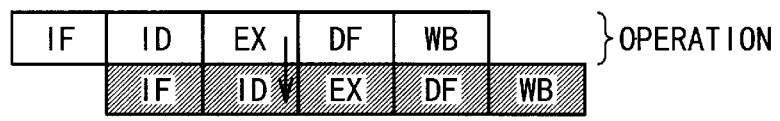
FIG. 2 shows a typical pipelining technique.
Figure 3:
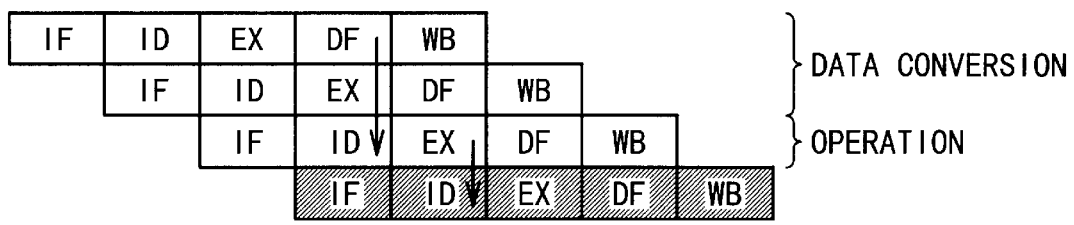
FIG. 3 shows a process of executing an instruction accompanied by a pre-operation data conversion in a pipelined data processor.
Figure 4:
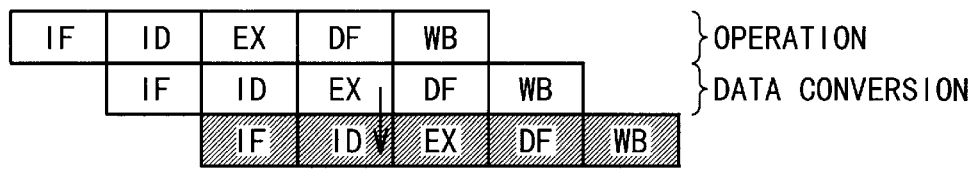
FIG. 4 shows a process of executing an instruction accompanied by a post-operation data conversion in a pipelined data processor.
Figure 5:
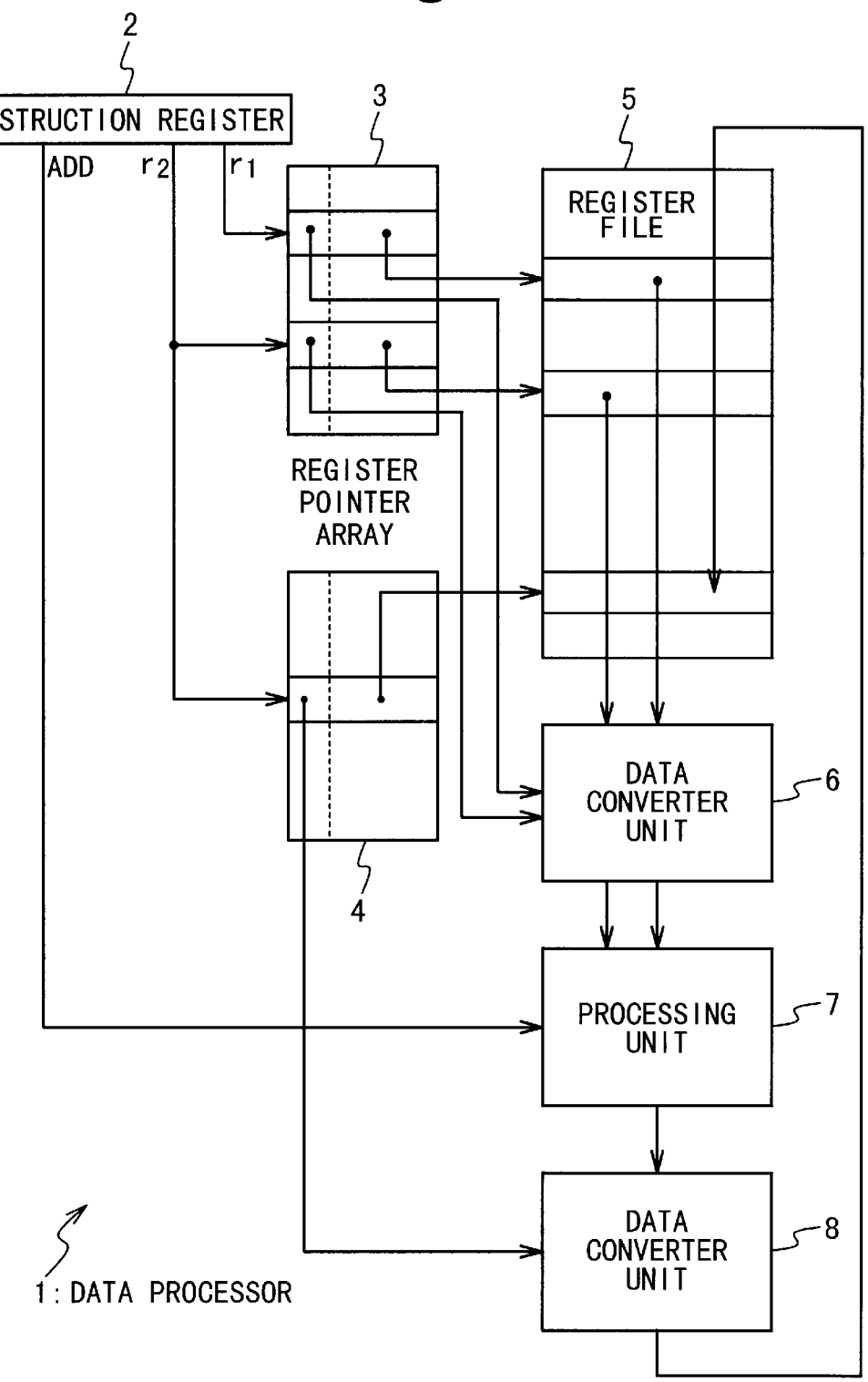
FIG. 5 is a block diagram of a data processor of a first embodiment of the present invention.

In a first embodiment, as shown in FIG. 5, a data processor 1 includes an instruction register 2, a read register pointer array 3, a write register pointer array 4, a register file 5, a pre-operation data converter unit 6, a processing unit 7 and a post-operation data converter unit 8.

The register file 5 is composed of a plurality of registers each of which stores an operand data to be operated by the processing unit 7. A plurality of data types are available for representing the operand data. The operand data may be represented by a word, a half word, or a byte, the operand data may be signed or may not be signed.

The instruction register 2 fetches an instruction word from a main memory. An instruction word is composed of an operation code, and first and second operand fields. The operation code specifies an operation to be executed by the processing unit 7. The first and second operand fields are respectively representative of a read register pointer address $r_1$, and a write register pointer address $r_2$. The read register pointer address $r_1$ is used for addressing the write register pointer array 3. The write register pointer address $r_2$ is used for addressing the write register pointer array 4.

The read register pointer array 3 is composed of a plurality of read register pointers. Each of the read register pointers stores therein a read register address specifying one of the registers included in the register file 5, and a data type of the data stored in the register specified by the read register address.

The write register pointer array 4 is composed of a plurality of write register pointers. Each of the write register pointers stores therein a write register address specifying one of the registers included in the register file 5, and a data type of the data stored in the register specified by the register address. The register specified by the write register address is a target register used for storing the operation result.

The pre-operation data converter unit 6 executes data conversion on the operand data to be operated by the processing unit 7. The converted operand data is represented by one word. The processing unit 7 executes the operation specified by the operation code on the converted operand data to produce an operation result.

The post-operation data converter unit 8 executes data conversion on the operation result to produce a converted operation result. The converted operation result is stored in the target register specified by the write register address stored in the write register pointer array 4.

The pre-operation data converter unit 6 and the post-operation data converter unit 8 are designed to be able to execute 8 kinds of data conversions: a not-signed byte conversion, a not-signed half-word conversion, a signed byte conversion, a signed half-word conversion, a signed byte saturation conversion, a signed half-word saturation conversion, a signed word saturation conversion and a word conversion.

The not-signed byte conversion converts a one-word data into a not-signed one-byte data. The not-signed half-word conversion converts a one-word data into a not-signed one-half-word data. The signed byte conversion converts a one-word data into a signed one-byte data. The signed half-word conversion converts a one-word data into a signed one-byte data.

The singed byte saturation conversion converts a one-word data into a signed one-byte data, wherein the signed one-byte data is determined as being its maximum or minimum value when the one-word data to be converted is out of the range representable with the signed one-byte data.

The signed half-word saturation conversion converts a one-word data into a singed one-half-word data wherein the signed one-half-word data is determined as being its maximum or minimum value when the one-word data to be converted is out of the range representable with the signed one-half-word data.

The signed word saturation conversion converts a one-word data into a signed one-word data, wherein the signed one-word data is determined as being its maximum or minimum value when the one-word data to be converted is out of the range representable with the signed one-word data.

And, the word conversion implies that the conversion is not done (non-conversion).

Figure 6:
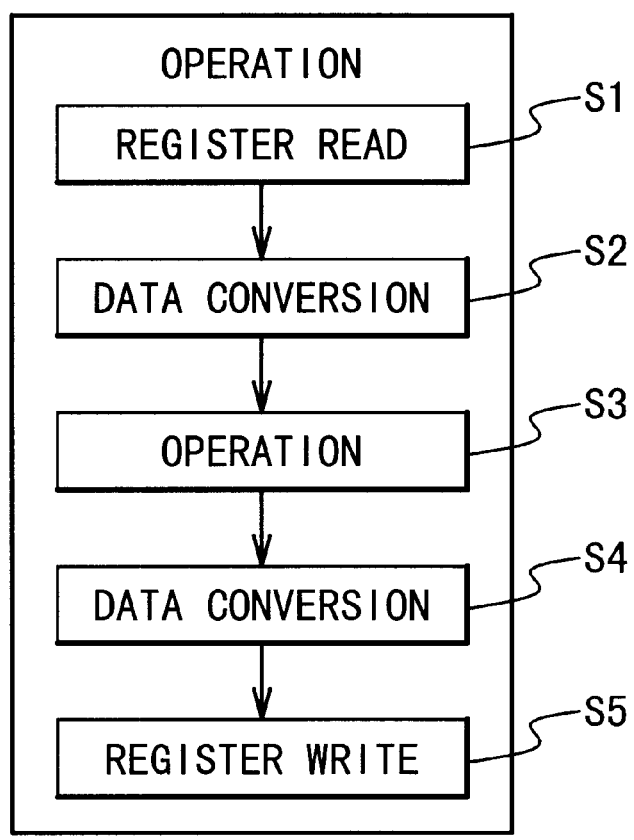
FIG. 6 is a flowchart showing an operation of the data processor according to the present invention.

FIG. 6 shows a process of executing an operation accompanied by a data conversion in the data processor 1. The process includes the steps: a register read (S1), a pre-operation data conversion (S2), an operation (S3); a data conversion (S4), and a register write (S5). These steps are executed in response to a single instruction word. A conventional data processor executes these steps by using software through three instructions. The data processor according to the present invention executes the steps through a single instruction by using hardware. This increases the operation speed of the data processor according to the present invention.

In the data processor 1, a process of executing an instruction word includes instruction fetch IF, instruction decode ID, instruction execution EX, data forward DF and data write WB.

The instruction fetch IF implies an action for fetching an instruction word from the main memory and storing in the instruction register 2.

The instruction decode ID implies an action for decoding the fetched instruction word. In the instruction decode ID, a pre-operation data conversion, an operation and a post-operation data conversion are specified by the operation code.

In detail, one of the registers in register file 5 is specified and selected by indirect addressing during the instruction decode ID. In detail, One of the read register pointers in read register pointer array 3 is specified and selected by the read register pointer address represented by the first operand field. The register address stored in the selected read register pointer is used for addressing or selecting one of the registers in the register file 5. An operand data to be operated by the data processing unit 7 is read from the selected register specified by using the write address pointer array 5.

Also, another one of the registers in register file 5 is specified and selected by indirect addressing during the instruction decode ID. In detail, One of the write register pointers in write register pointer array 4 is specified and selected by the write register pointer address represented by the second operand field. The register address stored in the selected write register pointer is used for addressing or selecting one of the registers in the register file 5. The operation result is stored in the selected register specified by using the write address pointer array 5.

The indirect addressing by using the read register pointer array 3 and the write register pointer array 4 enables the number of the registers of the register file 5 to be increased while compatibility of the instruction architecture is maintained.

The kind of the data conversion is specified by using the data types stored in the read register pointer array 3 and the write register pointer array 4. Which kind of the pre-operation data conversion is to be executed is specified by the data type that is stored in the read register pointer specified by the read register pointer address. In the same way, which kind of the post-operation data conversion is to be executed is specified by the data type that is stored in the write register pointer specified by the write register pointer address.

The instruction execution EX includes executing pre-operation data conversion and operation on an operand data. The pre-operation data conversion is achieved in the same clock cycle as the operation by using the pre-operation data converter unit 6.

The data forward DF includes executing post-operation data conversion on the operation result obtained by the instruction execution EX, and forwarding it to a buffer (not shown) to store therein. The post-operation data conversion is achieved in the same clock cycle as the data forwarding by using the post-operation data converter unit 8.

The data write WF implies an action for writing the converted operation result to the register file 5.

The data processor 1 is pipelined to execute a plurality of instruction words. That is, the data processor 1 executes a set of the five process steps for each of the instruction words while the executions of the sets of different instruction words are overlapped.

Figure 7:
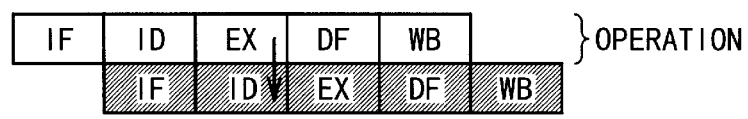
FIG. 7 shows a process of executing an instruction that is not accompanied by a data conversion in the first embodiment.

FIG. 7 shows the process of executing instruction words that are not accompanied by data conversion in the data processor 1. Instruction fetch IF, instruction decode ID, instruction execution EX, data forward DF and data write WB for a first instruction word is sequentially executed.

Instruction fetch IF for a second instruction word is executed in parallel with the instruction decode ID for the first instruction word, the instruction decode ID for second instruction word is then executed in parallel with the instruction execution EX for the first instruction word. Next, instruction execution EX for the second instruction word is executed in parallel with the data forward DF for the first instruction word, and the data forward DF for the second instruction word is executed in parallel with the data write WB for the first instruction word. Finally, the data write WB for the second instruction word is executed.

When the second instruction word has a dependence on the first instruction word, the operation result obtained by executing the first instruction word is converted into a data having a desired data type and forwarded during the instruction decode ID of the second instruction word. As a result, each of the instruction words can be substantially executed in one clock cycle.

Figure 8:
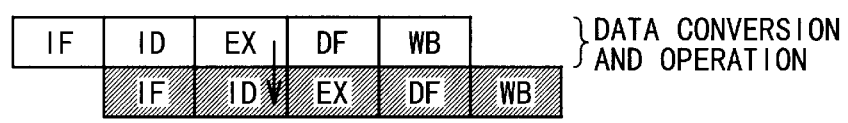
FIG. 8 shows a process of executing an instruction accompanied by a pre-operation data conversion.

In the first embodiment of the present invention, data conversion does not degrade the operation speed of the data processor 1. FIG. 8 shows the process of executing instruction words accompanied by pre-operation data conversion in the data processor 1. Firstly, the instruction fetch IF for a first instruction word is executed, and then the instruction decode ID for the first instruction word is executed. Next, the instruction execution EX for the first instruction word is executed. The pre-operation data conversion is executed during the instruction execution EX. Then, the data forward DF is executed. The post-operation data conversion is executed during the data forward DF. Finally, the data write WB for the first instruction word is executed.

Instruction fetch IF for a second instruction word, is executed in parallel with the instruction decode ID for the first instruction word, and instruction decode ID for the second instruction word is executed in parallel with the instruction execution EX for the first instruction word. Next, instruction execution EX for the second instruction word is executed in parallel with the data forward DF for the first instruction word, and the data forward DF for the second instruction is then executed in parallel with the data write WB for the first instruction word. Finally, the data write WB for the second instruction word is executed.

When the second instruction word has a dependence on the first instruction word, the operation result obtained by the instruction execution EX for the first instruction word is converted into a data having a desired data type and forwarded during the instruction decode ID for the second instruction word. As a result, each of the instruction words accompanied by pre-operation data conversion is executed substantially in one clock cycle.

Figure 9:
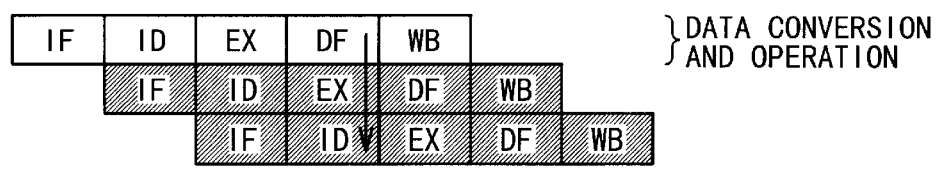
FIG. 9 shows a process of executing an instruction accompanied by a post-operation data conversion.
Figure 10:
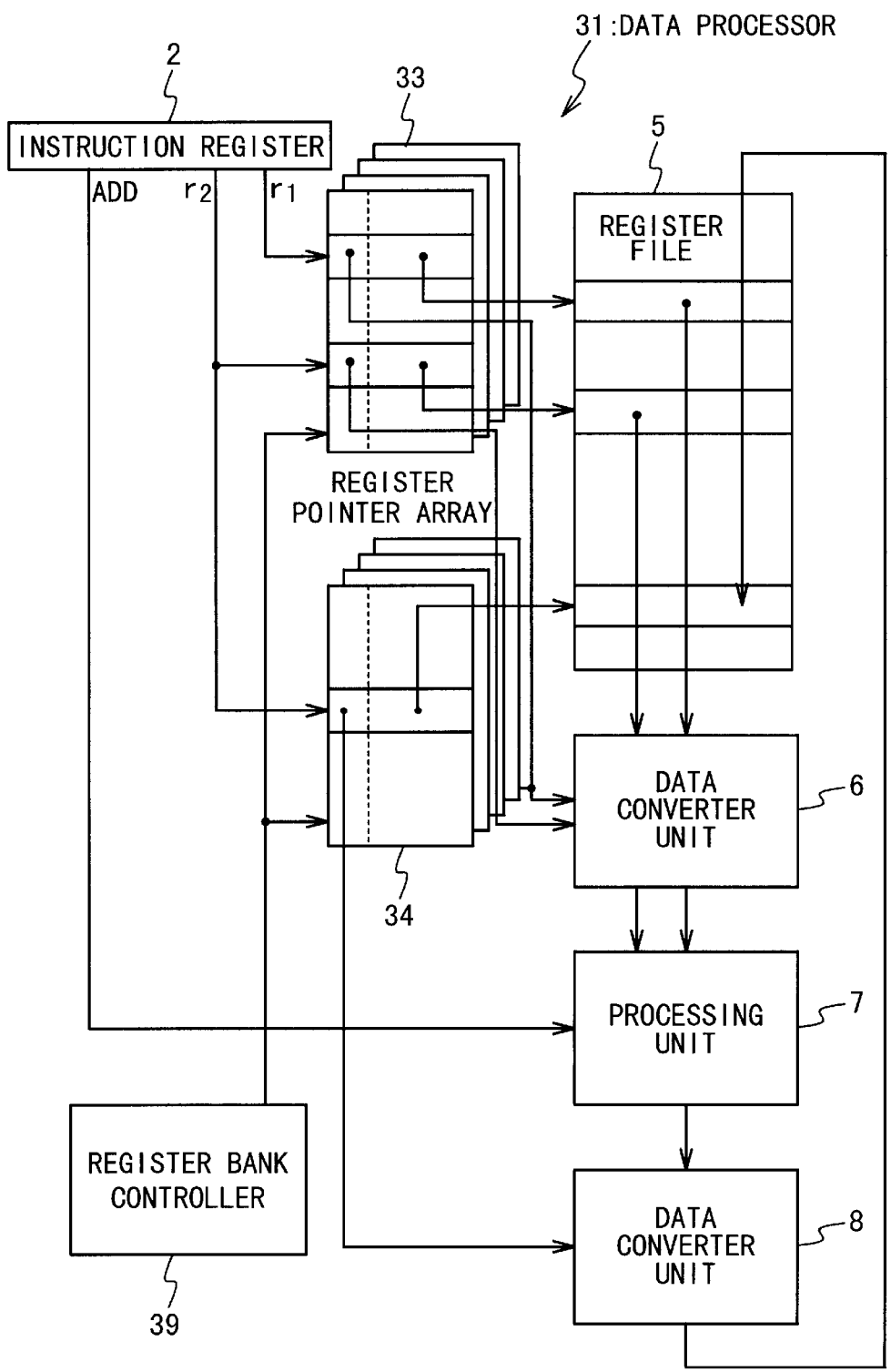
FIG. 10 is a block diagram showing a second embodiment of the data processor of the present invention.

FIG. 9 shows the process of executing instruction words accompanied by post-operation data conversion in the data processor 1. Instruction fetch IF for a first instruction word is firstly executed, and then the instruction decode ID for the first instruction is executed. Next, instruction execution EX for the first instruction word is executed, and the data forward DF is then executed. The post-operation data conversion is achieved during the data forward DF. This means that the data-converted operation result to be stored in the selected register is produced during the data forward DF. Finally, the data write WB is executed.

If a second instruction word to be next executed has no dependency on the first instruction word, instruction fetch IF for the second instruction word is executed in parallel with the instruction decode ID for the first instruction word. Then, the instruction decode ID for the second instruction word is executed parallel with the instruction execution EX for the first instruction word, and then the instruction execution EX is executed in parallel with the data forward DF for the previous instruction word. Data forward DF for the second instruction word is then executed in parallel with the data write WB for the first instruction word. Finally, the data write WB for the second instruction word is executed. In this case, each of the instruction words can be substantially executed in one clock cycle.

On the other hand, if the second instruction word has the dependency on the first instruction word, the instruction fetch IF for the second instruction word is executed in parallel with the instruction execution EX for the first instruction word. The instruction decode ID for the second instruction word is executed in parallel with the data forward DF for the first instruction word, and then the instruction execution EX for the second instruction word is executed in parallel with the data write WB for the first instruction word. Then the data forward DF and the data write WB for the second instruction word are sequentially executed. The operation result obtained by the instruction execution EX for the first instruction word is converted into a data having a desired data type and forwarded during the instruction execution EX for the second instruction word. As a result, the first instruction word, which is accompanied by the pre-operation type conversion, can be substantially executed in two clock cycles at worst. This means that the reduction of the operation speed is achieved by the data processor 1.

In the first embodiment, the pre-operation data conversion is executed in the same clock cycle as the operation, and thus the operation speed of the data processor 1 is increased.

Also, the data processor 1 allows reduction of the number of the instructions, because it is not necessary to provide the instructions for each of the available data types. The reduction of the number of the instructions enables to shorten the word length of the instructions.

FIG. 6 shows a second embodiment of the data processor according to the present invention. In a data processor 31 in the second embodiment, the read register pointer array 3 is replaced with a plurality of read register pointer arrays 33, and the write register pointer array 4 is replaced with a plurality of write register pointer arrays 34. A register bank controller 39 is added to the data processor 31.

Each of the read register pointer arrays 33 has the same function as the register pointer array 3 used in the first embodiment. Also, each of the write register pointer arrays 34 has the same function as the write register pointer array 4 used in the first embodiment.

The register bank controller 39 selects and activates one of the read register pointer arrays 33, and one of the write register pointer arrays 34. The activation of the read register pointer array 33 and write register pointer array 34 is achieved based on the instruction word.

In the second embodiment, the data processor 31 switches the read register pointer arrays 33 and write register pointer arrays 34 when indirectly addressing the register file 5. This enables to effectively use the register file 5 with a limited word length of the instructions when the register file 5 includes a large number of registers.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

In particular, it is understood that the number of operand fields included in an instruction word may be a desired number other than two. When an instruction word includes only one operand field, the register pointer address indicated by the only operand field is used as both of the read register pointer address and the write register pointer address.

What is claimed is:

1. A data processor comprising:
   a register file including a plurality of registers each of which stores therein an operand data;
   a register pointer section which includes a plurality of register pointers, each of which stores therein a register address and a data type of said operand data stored in said register specified by said register address;
   an instruction register which fetches an instruction word, wherein said instruction word includes:
   an operation code, and
   an operand field representative of a register pointer address used for addressing a selected one of said register pointers to thereby indirectly addressing a selected one of said registers;
   a data type converter unit executing a data conversion on said operand data stored in said selected one of said registers to produce a converted operand data, on the basis of said data type stored in said selected register pointer specified by said register pointer address;
   a processing unit executing an operation specified by said operation code on said converted operand data to produce an operation result.

2. The data processor according to claim 1, wherein said data conversion on said operand data is achieved without using software.

3. The data processor according to claim 1, wherein said data conversion on said operand data and said operation on said converted operand data is executed during the same clock cycle.

4. The data processor according to claim 1, wherein said instruction word further includes another operand field indicative of another register pointer address to thereby indirectly specify a target register from among said plurality of registers, and
   wherein said operation result is stored in said target register.

5. The data processor according to claim 4, further comprising another data converter unit
   wherein said another converter unit executes another data conversion on said operation result on the basis of said data type specified by said another register pointer address.

6. The data processor according to claim 5, wherein said another data conversion is achieved without using software.

7. The data processor according to claim 1, further comprising a register bank controller, wherein said register pointer section includes a plurality of register pointer arrays, each of said register pointer arrays respectively comprising ones of said register pointers, and wherein said register bank controller activates one of said plurality of register pointer arrays on the basis of said instruction word.

8. A data processor comprising:

a register file including a plurality of registers each of which stores therein an operand data;

a read register pointer section which includes a plurality of read register pointers, each of which stores therein a read register address and a data type of said operand data stored in said register specified by said read register address;

a write register pointer section which includes a plurality of write register pointers, each of which stores therein a write register address and a data type of said operand data stored in said register specified by said write register address;

an instruction register which fetches an instruction word, said instruction word including:

an operation code, and a first operand field indicative of a read register pointer address used for addressing a read register pointer from among said plurality of read register pointers to thereby indirectly address a read register from among said plurality of registers;

a second operand field indicative of a write register pointer address used for addressing a write register pointer from among said plurality of write register pointers to thereby indirectly address a write register from among said plurality of registers;

a first data type converter unit executing a data conversion on said operand data stored in said read register to produce a converted operand data on the basis of said data type specified by said read register pointer address;

a processor unit executing an operation specified by said operation code on said converted operand data to produce an operation result;

a second data type converter unit executing another data conversion on said operation result to produce a converted operation result on the basis of said data type specified by said write register pointer address, wherein said converted operation result is stored in said write register.

9. The data processor according to claim 8, wherein said first operand field is allowed to be used as said second operand field.

10. The data processor according to claim 8, further comprising a register bank controller, wherein said read register pointer section includes a plurality of read register pointer arrays, each of said read register pointer arrays respectively comprising ones of said read register pointers, and wherein said write register pointer section includes a plurality of write register pointer arrays, each of said write register pointer arrays respectively comprising ones of said write register pointers, and wherein said register bank controller activates one of said plurality of register pointer arrays on the basis of said instruction word.

11. A method of operating a data processor comprising:

providing a register file including a plurality of registers each of which stores therein an operand data;

providing a register pointer section which includes a plurality of register pointers, each of which stores therein a register address and a data type of said operand data stored in said register specified by said register address;

providing an instruction word including:

an operation code, and an operand field representative of a register pointer address used for addressing a selected one of said register pointers to thereby indirectly addressing a selected one of said registers;

executing a data conversion on said operand data stored in said selected one of said registers to produce a converted operand data, on the basis of said data type stored in said selected register pointer specified by said register pointer address;

executing an operation specified by said operation code on said converted operand data to produce an operation result.

* * * * *